J. A. BRAGAW.
Tilter for Tea-Pots.
No. 209,545.  Patented Nov. 5, 1878.
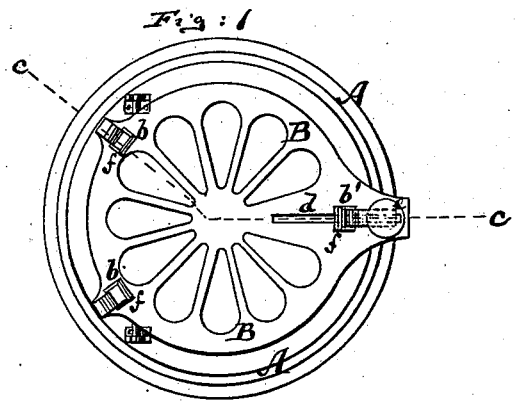
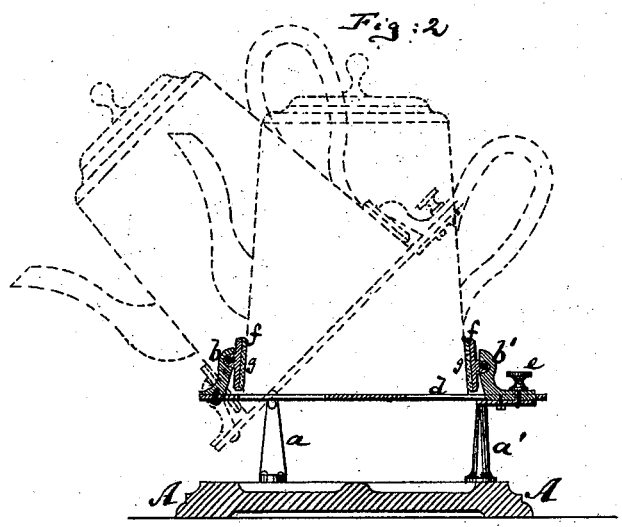
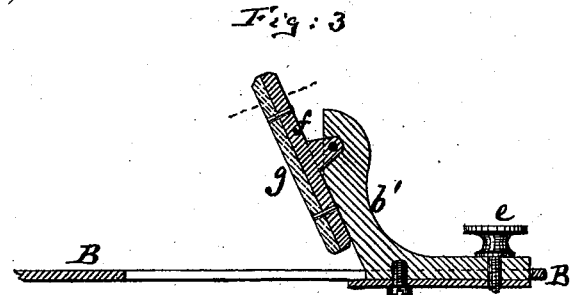
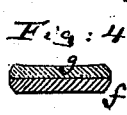
Witnesses:
John C Tunbridge
James Turk
Inventor:
John A. Bragaw
by his attorney
A. v. Briesen

UNITED STATES PATENT OFFICE.

JOHN A. BRAGAW, OF KINGSTON, NEW YORK.

IMPROVEMENT IN TILTERS FOR TEA-POTS.

Specification forming part of Letters Patent No. 209,545, dated November 5, 1878; application filed October 4, 1878.

*To all whom it may concern:*

Be it known that I, JOHN A. BRAGAW, of Kingston, county of Ulster, and State of New York, have invented a new and Improved Tilter for Tea-Pots, &c., of which the following is a specification:

This invention relates to an improved tilting platform which is adapted to hold a coffee or tea pot, can, or pitcher, and permits the contents of such vessel to be discharged by merely tilting the same with the platform.

By this invention the discharge of liquids is facilitated, and as the vessel is constantly supported its manipulation is rendered less difficult than heretofore.

The invention consists in the combination of an elevated platform, hinged to a suitable support, with three or more clamps which are adapted to secure a vessel to the platform.

The invention also consists in the other details of improvement hereinafter more fully pointed out.

In the accompanying drawings, Figure 1 represents a top view of my improved tilter for tea-pots, &c. Fig. 2 is a vertical section thereof on the line $c\ c$, Fig. 1, the dotted lines showing the platform in its tilted position, and also the two positions of the pot placed on the platform. Fig. 3 is a detail vertical section through the adjustable clamp and part of the platform, showing the same on an enlarged scale; Fig. 4, a detail transverse section thereof.

Similar letters of reference indicate corresponding parts in all the figures.

The letter A represents the base of my improved tilter, made of wood, metal, or other suitable material, and of circular or other form. From the upper side of the base A project upwardly two or more uprights, $a\ a'$. To the upright $a$ is hinged a platform, B, of sheet metal or other material, of preferably circular form, and of a size somewhat larger than the base of the pot to be placed thereon. The platform B is, by the uprights $a\ a'$, supported in a horizontal or nearly horizontal position, it resting on the top of the said uprights, as clearly shown in Fig. 2. To the upper side of the platform B, and near to the periphery thereof, are secured three or more upwardly-projecting lugs, $b\ b\ b'$, of which I prefer to rigidly fasten the lugs $b\ b$ to the platform, while the lug $b'$ is adjustable, and may be moved farther toward or away from the center of the platform B along a suitable radial guide groove or slot, $d$.

The lug $b'$ may be locked at any desired position by a suitable clamp or thumb-screw, $e$. (Clearly shown in Fig. 3.)

To the inner sides of the lugs $b\ b\ b'$ are respectively hinged pads $f\ f$, which I prefer to supply with rubber or other cushions, $g$. (Shown in Figs. 2, 3, and 4.)

In use, the tea or coffee pot D is securely clamped to the upper side of the platform B, between the clamps $b\ b\ b'$, the clamp $b'$ being, after the insertion of the pot, locked tightly against the same by the thumb-screw $e$.

The pivoted cushioned pads $f$ will adapt themselves to the shape of the pot D, be the same cylindrical, conical, or of other form.

If the contents of the pot are to be discharged into cups or glasses, it is merely necessary to tilt the pot, together with the platform B, as indicated by dotted lines in Fig. 2. This figure also shows the pot in its normal position on the platform B—that is, before the latter is tilted.

By this invention, it will be seen, the constant lifting of the pot, whenever its contents are to be discharged, is avoided and its manipulation facilitated.

If desired, all the three clamps $b\ b\ b'$ may be made adjustable, and in place of the pivoted pads $f$ other cushioned pads may be used.

A spirit-lamp may be placed on the base A, beneath the platform B and pot, to keep its contents warm.

I claim—

1. The combination of the uprights $a\ a'$ with the hinged and tilting platform B, having lug $b$ and adjustable sliding lug $b'$, substantially as and for the purpose specified.

2. The combination of the uprights $a\ a'$, hinged platform B, and lugs $b\ b'$ with the cushioned pads $f$, which are hinged to the lugs $b\ b'$, respectively, substantially as and for the purpose herein shown and described.

JOHN A. BRAGAW.

Witnesses:
 S. LEFEVER,
 ABNER D. HOLT.